United States Patent
Balasubramanian et al.

(10) Patent No.: US 9,868,586 B2
(45) Date of Patent: Jan. 16, 2018

(54) NON-UNIFORMLY PERFORATED PLASTIC BAG

(71) Applicant: AgroFresh Inc., Collegeville, PA (US)

(72) Inventors: Aishwaraya Balasubramanian, Somerset, NJ (US); Nazir Mir, North Brunswick, NJ (US); Robert L. McGee, Midland, MI (US); Bruce A. Menning, Midland, MI (US)

(73) Assignee: AGROFRESH INC., Collegeville, PA (US)

( * ) Notice: Subject to any disclaimer, the term of this patent is extended or adjusted under 35 U.S.C. 154(b) by 0 days.

(21) Appl. No.: 15/646,698

(22) Filed: Jul. 11, 2017

(65) Prior Publication Data

US 2017/0305651 A1 Oct. 26, 2017

Related U.S. Application Data

(62) Division of application No. 14/437,371, filed as application No. PCT/US2013/065614 on Oct. 18, 2013.

(60) Provisional application No. 61/718,320, filed on Oct. 25, 2012.

(51) Int. Cl.
| | |
|---|---|
| *B65D 85/34* | (2006.01) |
| *B65D 81/20* | (2006.01) |
| *B65D 77/06* | (2006.01) |
| *B65D 33/01* | (2006.01) |
| *A23B 7/152* | (2006.01) |

(52) U.S. Cl.
CPC ............ *B65D 85/345* (2013.01); *A23B 7/152* (2013.01); *B65D 33/01* (2013.01); *B65D 77/062* (2013.01); *B65D 81/2023* (2013.01); *B65D 81/2084* (2013.01); *A23V 2002/00* (2013.01)

(58) Field of Classification Search
CPC B65D 85/345; B65D 81/2023; B65D 77/062; B65D 33/01; B65D 81/2084; A23B 7/152; A23V 2002/00
See application file for complete search history.

(56) References Cited

U.S. PATENT DOCUMENTS

| | | | |
|---|---|---|---|
| 2,774,402 | A | 4/1951 | Wikle |
| 5,433,335 | A | 7/1995 | Raudalus et al. |
| 5,556,658 | A | 9/1996 | Raudalus et al. |
| 6,045,838 | A | 4/2000 | Davis et al. |

(Continued)

FOREIGN PATENT DOCUMENTS

| | | |
|---|---|---|
| CN | 2471097 Y | 1/2002 |
| FR | 2378688 | 8/1978 |
| JP | A-06-125701 | 5/1994 |

(Continued)

OTHER PUBLICATIONS

PCT Search Report and Written Opinion for PCT/US2013/065614, completed Dec. 5, 2013.

(Continued)

*Primary Examiner* — Michael C Miggins
(74) *Attorney, Agent, or Firm* — Barnes & Thornburg LLP

(57) ABSTRACT

Provided is a perforated plastic bag wherein the volume of said bag is 100 liters or more; wherein the average perforation diameter is 500 micrometers or less; wherein said plastic bag comprises a lower zone and a top zone, wherein the perforation density of said lower zone is greater than the perforation density of said top zone. Also provided is a method of using such a plastic bag.

20 Claims, 2 Drawing Sheets

(56) References Cited

U.S. PATENT DOCUMENTS

Figure 1:
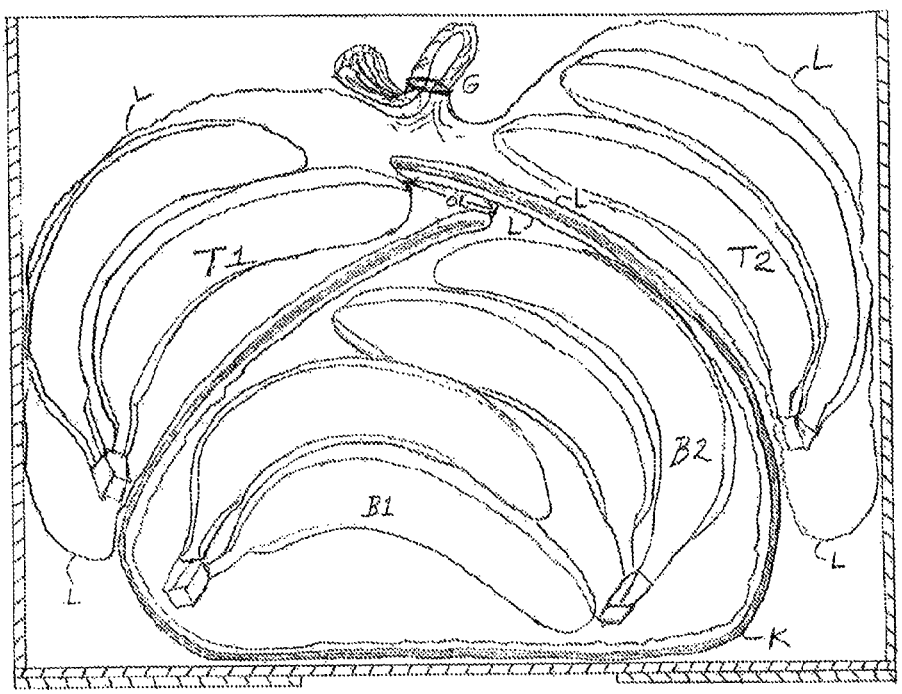

2011/0293802 A1    12/2011   Alfaro et al.
2015/0274406 A1    10/2015   Balasubramanian et al.

FOREIGN PATENT DOCUMENTS

| KR | 20100129662 A | 12/2010 |
|----|---------------|---------|
| WO | WO1997011885  | 4/1997  |
| WO | WO2004/045972 | 6/2004  |
| WO | WO2011/082059 | 7/2011  |

OTHER PUBLICATIONS

Polyethics.com. Retrievd from Internet URL:<http://www.polyethics.com/wp-content/uploads/2012/11/Bag-Gallon-Litre.pdf>.

NON-UNIFORMLY PERFORATED PLASTIC BAG

CROSS-REFERENCE TO RELATED APPLICATIONS

This present application is a divisional of U.S. application Ser. No. 14/437,371, filed Apr. 21, 2015, which is a national stage entry under 35 USC §371(b) of PCT International Application No. PCT/US2013/065614, filed Oct. 18, 2013, and claims priority under 35 U.S.C. §119(e) to U.S. Provisional Application Ser. No. 61/718,320, entitled "NONUNIFORMLY PERFORATED PLASTIC BAG," which was filed on Oct. 25, 2012, the entirety of each of which is hereby incorporated herein by reference.

Bananas are normally harvested by cutting a bunch of bananas from the pseudostem on which it grew. Subsequent to harvest, bunches are often broken down into smaller connected groups called "hands" or, synonymously, "clusters". It is common to harvest and then ship bananas while the peels are green. Long-distance shipment is often performed at low temperature (for example, at 14° C.). Bananas are considered to ripen very slowly during such shipment, during which the bananas normally remain green.

Bananas, during shipment, are often packed in relatively large boxes that hold 5 kg or more of bananas. One commonly used size box holds approximately 18 to 19 kg. A typical packing process begins by inserting a kraft paper liner into the box. The kraft paper liner is typically macro perforated with holes of 0.5 cm to 1.5 cm diameter to provide ventilation. In normal industry practice, a plastic liner is then inserted into the box on top of the kraft liner. This plastic liner is sometimes an open tube and is sometimes a tube with a sealed bottom. A first portion of bananas is then placed into the box. The plastic liner is then folded shut towards the middle of the box, and the shorter end of the kraft paper liner is folded shut towards the middle of the box. Thus, there is a layer of material that resides above the first portion of bananas, and that layer contains both bag material and kraft paper. Then, a second portion of bananas is normally placed into the bag above that layer. The plastic liner is normally then pulled closed above the second portion of bananas; twisted shut; and then held closed using an appropriate closure device. Often, when the plastic bag is a Modified Atmosphere Package ("MAP"), two different atmospheres develop: one atmosphere surrounding the first portion of bananas and a different atmosphere surrounding the second portion of bananas. These different atmospheres can create differences in the ripening advancement and shelf life of the bananas; such differences are undesirable. In some cases, the oxygen level in the bottom half of the bag drops too low and the bananas become anaerobic, which causes them to be ruined. It is desired to provide a plastic bag that is capable of reducing such differences in internal atmospheres in different portions of the bag when produce has been packed in those different portions of the bag and after the bag has been tightly sealed.

It is common, once the bananas have reached a location near where they will be sold, to place them in an enclosed volume and expose them to exogenous ethylene gas. Typical ethylene exposure is 24-48 hours at 14-18° C. in an atmosphere that contains ethylene at concentration of 100-1000 microliter per liter (ppm). After the exposure to exogenous ethylene, the bananas normally ripen more quickly. As the bananas ripen, the peels gradually turn yellow; the peels remain yellow for some time; then the peels develop a small number of black spots; and eventually the bananas become undesirably over-ripe. Sometimes, the bananas are also exposed (either before, during, or after exposure to ethylene) to one or more additional gaseous compound, such as for example 1-methylcyclopropene. It is desired to provide a plastic bag that has the correct gas transport properties so that, when a bag containing produce is exposed to an atmosphere that contains ethylene and/or another gaseous compound, the concentration of ethylene and/or the other gaseous compound, is within the desired concentration range in both the top and the bottom of the box.

The following is a statement of the invention.

The first aspect of the present invention is a perforated plastic bag wherein the volume of said bag is 100 liters or more; wherein the average perforation diameter is 500 micrometers or less; wherein said plastic bag comprises a lower zone and a top zone, wherein the perforation density of said lower zone is greater than the perforation density of said top zone.

The second aspect of the present invention is a method of treating produce comprising: (a) placing a first portion of produce in the bottom of the plastic bag of the first aspect; (b) after step (a), folding said bag to form a layer of bag material over said first portion of produce; (c) after step (b), placing a second portion of produce in said bag above said layer of bag material; and (d) after step (c), closing said bag.

The following is a brief description of the drawings.

FIG. 1 is an end view of a box (BX) containing bananas. There are four rows of bananas that run the length of the box. K is a kraft paper liner. L is a plastic bag, often referred to as a "liner." B1 and B2 is each a row of bananas in the bottom portion of the bag. T1 and T2 is each a row of bananas in the top portion of the bag. OL is the overlap length by which one end of the kraft paper liner K overlaps the other end of the kraft paper liner K. G is a gripper that holds the top of the bag L closed.

Figure 2:
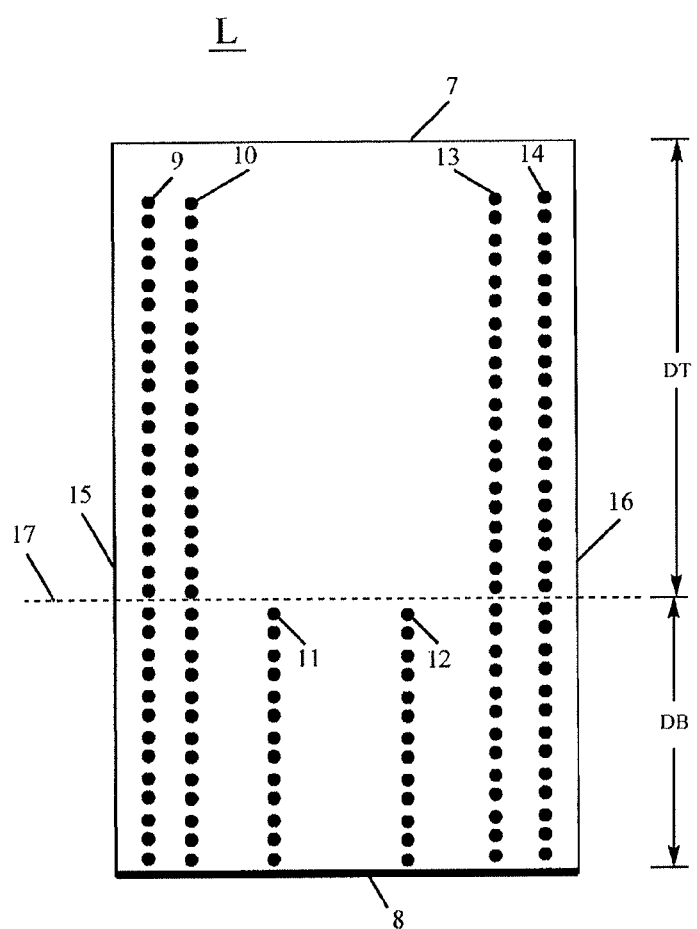

FIG. 2 is a top view of one embodiment of a plastic bag L. The bag L is shown flattened. The left side 15 is sealed; the right side 16 is sealed, and the bottom 8 is sealed. The top 7 is open. The bag L consists of two film layers: the layer visible in FIG. 2 and an identical layer underneath. There are six lanes of microperforations: 9, 10, 11, 12, 13, and 14. The dots shown in FIG. 2 are enlarged for clarity. The number of perforations and the distance between them will vary considerably; the dots shown in lanes 9, 10, 11, 12, 13, and 14 do not represent the exact placement of the microperforations, other than to show that, in the embodiment shown, the microperforations are present in relatively straight lanes. Lanes 11 and 12 are considerably shorter than lanes 9, 10, 12, and 13. Each perforation penetrates both layers of the bag L. Line 17 is an imaginary line that is parallel to the top 7 and the bottom 8. The distance from the imaginary line L to the top 7 of the bag L is DT. The distance from the imaginary line to the bottom 8 of the bag L is DB.

The following is a detailed description of the invention.

As used herein, a bag is a flexible enclosure. A bag has one opening; it is possible to place one or more objects inside the bag and then close the opening. It is not necessary that the bag be able to support the weight of the object or objects inside it.

A plastic bag is a bag, the composition of which contains 50% or more polymer by weight based on the weight of the bag.

A "rectangular" bag is a bag for which it is possible to lay the bag on a flat surface and flatten the bag so that it exists as two identical flat layers, one on top of the other, and the horizontal shape of those two layers is a rectangle. When a rectangular bag is laid down that way, the edge of the opening forms one side of the rectangle; that edge is known herein as the top of the bag. The edge opposite to the top of the bag is known herein as the bottom of the bag. The "zones" of the bag may be determined as follows: an imaginary line is considered that is parallel to top of the bag and parallel to the bottom of the bag; a rectangle is formed by the imaginary line, the sides of the bag, and the top of the bag; the portion of the bag encompassed by that rectangle, including both layers of the bag, is known herein as the top zone of the bag. Additional imaginary lines may be considered that are parallel to the first imaginary line and that are located between the first imaginary line and the bottom of the bag. The portion of the bag encompassed by the rectangle formed by the imaginary line closest to the bottom of the bag, the sides of the bag, and the bottom of the bag is known herein as the bottom zone. Each rectangle formed by two imaginary lines and the sides of the bag encompasses an "intermediate" zone. The intermediate zones (if any) and the bottom zone are known collectively as lower zones.

If the bag is not rectangular, the zones are determined as follows. The opening of the bag is gathered together to close the bag. The bag is then suspended from the closure and allowed to hang freely. An imaginary horizontal plane is considered that is between the closure and the bottom-most point of the bag. The portion of the bag above that plane is the top zone of the bag. Additional imaginary horizontal planes may be considered in between the first imaginary horizontal plan and the bottom-most point of the bag. The intermediate, bottom, and lower zones are then determined as in the case of the rectangular bag.

As used herein, "banana" refers to any member of the genus *Musa*, including, for example, bananas and plantains.

As used herein, a "film" is an object made of polymer that is much smaller in one dimension (the "thickness") than in the other two dimensions and that has a relatively uniform thickness. Film has thickness of 1 mm or less. As used herein, a polymeric film is a film, the composition of which contains 50% or more polymer by weight based on the weight of the film.

As used herein, a "monomer" is a compound that has one or more carbon-carbon double bond that is capable of participating in a polymerization reaction (i.e., a chemical reaction among monomers that forms a polymer). As used herein, an "olefin monomer" is a monomer, the molecules of which contain only atoms of carbon and hydrogen. As used herein, "polar monomer" is a monomer, the molecules of which contain one or more polar group.

A "polymer," as used herein, is a relatively large molecule made up of repeated units of the reaction products of monomers. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

As used herein, a perforation is a hole that penetrates through a film. The size of a perforation is best described by its open area either in actual units of area such as micrometer or mm$^2$ or by a diameter of a circle with the same area. The size of the perforation can be measured in several ways. One such way is to obtain a digital photograph of the perforation using a microscope at a known magnification such as 50× and a photograph of a calibration tool such as a stage micrometer at the same magnification. Using a pixel count program such as ImageJ, the calibration photograph can be used to calibrate the size of an individual pixel and the ImageJ software can be used to count the number of pixels within the perforation area. Another more direct method is to use a instrument specifically designed to measure area of small objects such as that sold by Keyence Corporation or Micro-Vu. These systems provide a best fit ellipse to the perforation as expressed by the elliptical parameters "a" and "b".

A hole of diameter 500 micrometers or smaller is known herein as a microperforation. A film having multiple microperforations is known herein as a microperforated film. A hole of diameter 1 millimeter or larger is known herein as a macroperforation. A film having multiple macroperforations is known herein as a macroperforated film.

A film or a portion of a film that has multiple perforations may be characterized by the perforation density, which is the number of perforations per unit of surface area of the film.

As used herein, when a ratio is said to be "X:1 or higher," it is meant that the ratio is Y:1, where Y is greater than or equal to X. For example, if it is stated herein that a ratio is "5:1 or higher," it is meant that that ratio may be, for example, 5:1 or 6:1 or 100:1 but may not be, for example, 4:1 or 0.1:1. Similarly, when a ratio is said to be "W:1 or lower," it is meant that the ratio is Z:1, where Z is less than or equal to W. For example, if it is stated herein that a ratio is "20:1 or lower," it is meant that that ratio may be, for example, 20:1 or 19:1 or 1:1 but may not be, for example, 21:1 or 90:1.

An enclosure that is designed to contain produce (i.e., fruits or vegetables) in a atmosphere other than normal ambient air is called a "Modified Atmosphere Package" (MAP). Passive MAP takes advantage of the fact that some produce (bananas, for example) respire after harvest. Thus such produce, when placed in an enclosure, among other processes, consumes oxygen and produces carbon dioxide. The MAP can be designed so that diffusion through the solid exterior surfaces of the MAP and passage of gas through any perforations that may be present in the exterior surface of the MAP maintain preferred levels of oxygen, carbon dioxide, and optionally other gases (such as, for example, water vapor or ethylene or both).

It is useful to characterize the inherent gas transmission characteristics of a polymeric film. By "inherent" it is meant the properties of the film itself, in the absence of any perforations or other alterations. Industry standard methods ASTM D3985 for O2, ASTM 1434 for CO2, and ASTM F1249 for H2O can readily be used to characterize the gas transmission characteristics of a polymer film.

As used herein a cyclopropene compound is any compound with the formula

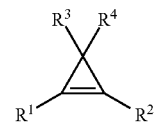

where each $R^1$, $R^2$, $R^3$ and $R^4$ is independently selected from the group consisting of H and substituted and unsubstituted hydrocarbyl groups.

The concentration of a substance in an atmosphere is characterized herein either as parts of substance by volume per one million parts by volume of atmosphere (ppm) or as parts of substance by volume per one billion parts by volume of atmosphere (ppb).

The present invention involves a plastic bag. Preferably, the bag is capable of behaving as a passive MAP for bananas.

Preferably, the composition of the plastic bag is polymeric film. Preferable polymeric films have average thickness of 5 micrometer or more; more preferably 10 micrometer or more; more preferably 15 micrometer or more. Preferable polymeric films have average thickness of 200 micrometer or less; more preferably 100 micrometer or less; more preferably 50 micrometer or less.

Preferably, the composition of the bag contains, by weight based on the weight of the bag, polymer in the amount of 75% or more; more preferably 85% or more; more preferably 90% or more.

Some suitable polymer compositions include, for example, polyolefins, polyvinyls, polystyrenes, polydienes, polysiloxanes, polyamides, vinylidene chloride polymers, vinyl chloride polymers, copolymers thereof, blends thereof, and laminations thereof. Suitable polyolefins include, for example, polyethylenes, polypropylenes, copolymers thereof, blends thereof, and laminations thereof. Suitable polyethylenes include, for example, low density polyethylene, ultralow density polyethylene, linear low density polyethylene, metallocene-catalyzed polyethylene, copolymers of ethylene with polar monomers, medium density polyethylene, high density polyethylene, copolymers thereof and blends thereof. Suitable polypropylenes include, for example, polypropylene and oriented polypropylene. In some embodiments, low density polyethylene is used. In some embodiments, copolymer of styrene and butadiene is used.

Preferred polymer compositions contain one or more polyolefin; more preferred is polyethylene; more preferred is metallocene-catalyzed polyethylene. More preferred polymer compositions contain one or more polyolefin and one or more copolymer of an olefin monomer with a polar monomer. Preferred polar groups are hydroxyl, thiol, carbonyl, carbon-sulfur double bond, carboxyl, sulfonic acid, ester linkages, and combinations thereof. Suitable copolymers of an olefin monomer with a polar monomer include, for example, such polymers available from DuPont called Elvax™ resins. Preferred copolymers are copolymers of ethylene with one or more polar monomer. Preferred polar monomers are vinyl acetate, methyl acrylate, ethyl acrylate, butyl acrylate, acrylic acid, methacrylic acid, and mixtures thereof; more preferred is vinyl acetate.

Preferred are polymeric films with inherent oxygen permeability coefficient, in units of $cm^3{}_{OC}$ mil/($m^2$ day), of 2,000 or higher; more preferably 4,000 or higher; more preferably 6,000 or higher. Preferred are polymeric films with inherent oxygen permeability coefficient, in units of $cm^3{}_{OC}$ mil/($m^2$ day), of 50,000 or lower; more preferably 25,000 or lower; more preferably 15,000 or lower.

Preferred are polymeric films with inherent carbon dioxide permeability coefficient, in units of $cm^3{}_{OC}$ mil/($m^2$ day), of 10,000 or higher; more preferably 20,000 or higher; more preferably 30,000 or higher. Preferred are polymeric films with inherent carbon dioxide permeability coefficient, in units of $cm^3{}_{OC}$ mil/($m^2$ day), of 100,000 or lower; more preferably 75,000 or lower; more preferably 60,000 or lower.

Polymeric film is used that has perforations. Preferably, the holes have mean diameter of 5 micrometers or more; more preferably 10 micrometers or more; more preferably 20 micrometers or more; more preferably 50 micrometers or more; more preferably 100 micrometers or more. Preferably, the holes have mean diameter 300 micrometers or less; more preferably 200 micrometers or less.

The perforations may be arranged in straight lines, in multiple straight lines, in random patterns, or in combinations thereof. When perforations are arranged in one or more straight lines, the spacing between perforations may be the same for the entire line or may vary along the line. When perforations are arranged in one or more straight lines, the lines may be located at and/or near the center of the bag, at and/or near the edge of the bag, or any combination thereof.

Holes in polymeric film may be made by any method. Suitable methods include, for example, laser perforation, hot needles, flame, low-energy electrical discharge, and high-energy electrical discharge. One preferred method is laser perforation. Among embodiments in which laser perforation is used, it is preferred to design or select polymeric film that is well suited to laser perforation. That is, the polymeric film is designed or selected so that the laser easily makes holes that are round and have predictable size. Preferred laser is a carbon dioxide laser. For different polymeric film compositions, the appropriate wavelength of laser light may be chosen. For polymeric films that contain polyethylene and/or copolymers of ethylene with one or more polar monomer, it is preferred to choose a carbon dioxide laser producing infrared light that includes infrared light of wavelength 10.6 micrometer.

A bag may be made by first making a tube and then sealing one end of the tube to form a bag.

Preferred are rectangular bags.

Preferred are bags (herein called "B40" bags) that have sufficient capacity to enclose 19 kg of average-sized bananas in a configuration as depicted in FIG. 1.

It is useful to characterize a zone of a perforated bag by the perforation density, which is the quotient that results when dividing the total area of all the perforation in that zone by the surface area of that zone.

Among B40 bags, preferred are bags in which the top zone has perforation density, in units of $mm^2$ of perforation per $m^2$ of the surface area of the bag, of 2 or higher; more preferably 4 or higher. Among B40 bags, preferred are bags in which the top zone has perforation density, in units of $mm^2$ of perforation per $m^2$ of the surface area of the bag, of 12 or lower; more preferably 10 or lower.

Among B40 bags, preferred are bags that have one or more lower zone in which the ratio of the perforation density in that lower zone to the perforation density in the top zone is 1.01:1 or greater; more preferably 1.1:1 or greater; more preferably 1.2:1 or greater. Among B40 bags, preferred are bags that have one or more lower zone in which the ratio of the perforation density in that lower zone to the perforation density in the top zone is 6:1 or lower; more preferably 5:1 or lower.

Among B40 bags, preferred are bags that have exactly two zones. Two-zone bags may be characterized by the ratio (the "division ratio") of the distance from the top of the bag to the imaginary line (or plane) that divides the zones to the distance from the imaginary line (or plane) that divides the zones to the bottom of the bag. Preferably, the division ratio is 1:1 or greater; more preferably 1.5:1 or greater; more preferably 1.8:1 or greater. Preferably, the division ratio is 3:1 or less; more preferably 2.5:1 or less.

Preferred B40 bags have volume of 200 liter or more; more preferably 300 liter or more. Preferred bags have volume of 2,000 liter or less; more preferably 1,500 liter or less.

Preferred embodiments of the plastic bag of the present invention may be described by reference to FIG. 2. Preferably, the bag L has plural lines of perforation 9, 10, 11, 12, 13, and 14. Lines of perforation 9, 10, 13, and 14, extend 90% or more of the length of bag L; the length of bag L is the distance from the top 7 to the bottom 8. The bag L is preferably made by extruding and blowing a tube in the direction from the bottom 8 to the top 7 (or from the top 7 to the bottom 8). Because of the extrusion and film-blowing process, the sides 15 and 16 are closed. Lines of perforation 11 and 12 are shorter than lines 9, 10, 13, and 14. Imaginary line 17 is preferably drawn where lines of perforation 11 and 12 end. The ratio of distance DT to distance DB is preferably 2.5:1 to 1.5:1.

In preferred embodiments, the plastic bag of the present invention is put to use as follows, as illustrated in FIG. 1.

First, a cardboard box BX is provided that is large enough to hold 19 kg of average-sized bananas. The cardboard box BX has multiple holes of diameter 20 mm or larger, to allow ventilation. A kraft paper liner K is inserted into the box; preferably the kraft paper liner K is macroperforated with holes of 6 mm to 14 mm diameter to provide ventilation. A plastic bag of the present invention L is then inserted into the box on top of the kraft paper liner K. Two rows of bananas (B1 and B2) are then placed into the center of the box BX running the length of the box BX. The plastic bag L is then folded shut, above the two rows of bananas B1 and B2, towards the middle of the box BX and the shorter end of the kraft paper liner K is folded shut, above the two rows of bananas B1 and B2, towards the middle of the box BX. The length of the kraft paper liner K is preferably approximately 90 cm and is preferably arranged such that there is an overlap OL of the two ends. This overlap helps prevent scuffing of the top layers of bananas during shipment. The plastic bag L is then folded open on top of the short end of the kraft paper liner K. Then, a row of bananas T1 is placed on top of the plastic bag L. The long end of the kraft paper liner K is then folded shut over the crowns or tips of the top row of bananas T1 and the plastic bag L is pulled open above the long side of the kraft paper liner K. Another row of bananas T2 is then placed on the top of the plastic bag L on this long kraft paper liner side. The plastic bag L is pulled closed above T1 and T2 twisted shut; and then held closed using a gripping device G. Preferably, G is a rubber band; a tape closure; or some other appropriate closure device. The closing of the micro-perforated plastic bag L enables a Modified Atmosphere (MA) to develop inside the plastic bag L during the shipment, ripening, and storage of the bananas.

The kraft liner overlap OL provides enough of a barrier to gas movement that the single closed plastic bag L creates two distinct MA in the box; one MA for the bottom layer of bananas; B1 and B2; and one MA for the top layer of bananas; T1 and T2.

If a plastic bag of the present invention were not used, these distinct MA's for the bottom and top of the box could create undesirably large differences in the ripening advancement and shelf life of the bananas. If a plastic bag of the present invention were not used the gas movement barrier could also cause the bananas in the bottom of the box to go anaerobic if the oxygen level is too low in the MA of the bottom of the box, and going anaerobic ruins the bananas.

The length of the kraft paper liner K is defined as the length as shown in FIG. 1. That is, the length of the kraft paper liner K is taken herein to be the distance along the kraft paper liner K from one of the overlapped ends of the kraft paper liner K, down one side of the box BX, across the bottom of the box BX, up the other side of the box BX, to the other of the overlapped ends of the kraft paper liner K.

The length of the plastic bag L for the bottom of the box BX and the top of the box BX may be different. The length of the bag L for the bottom of the box BX is taken to be the length of an imaginary line drawn along the surface of the plastic bag L where it is adjacent to the kraft paper liner K as shown in FIG. 1. Preferably, ratio of the length of the plastic bag L for the bottom of the box BX to the length of the kraft paper liner K is 0.5:1 or higher; more preferably 0.75:1 or higher; more preferably 0.9:1 or higher. Preferably, ratio of the length of the plastic bag L for the bottom of the box BX to the length of the kraft paper liner K is 2:1 or lower; more preferably 1.3:1 or lower; more preferably 1.1:1 or lower.

Preferably, a plastic bag L is used as illustrated in FIG. 2 in such a way that the length of the plastic bag L for the bottom of the box BX is 2*DB.

It is useful to consider the portion of the plastic bag L that encloses banana rows T1 and T2; that portion is known herein as the "top enclosure" of plastic bag L. For example, in FIG. 1, the top enclosure of plastic bag L is the portion of plastic bag L that surrounds banana rows T1 and T2. The top enclosure is that portion of plastic bag L between the part of the plastic bag L that is closed by gripper G and the part of the plastic bag L that participates in the fold that lies above banana rows B1 and B2 and below banana rows T1 and T2.

It is also useful to consider the portion of the plastic bag L that encloses banana rows B1 and B2; that portion is known herein as the "bottom enclosure" of plastic bag L. For example, in FIG. 1, the bottom enclosure of plastic bag L is the portion of plastic bag L that surrounds banana rows B1 and B2. The bottom enclosure is that portion of plastic bag L between the bottom 8 of the plastic bag L and the part of the plastic bag L that participates in the fold that lies above banana rows B1 and B2 and below banana rows T1 and T2.

The surface area of the top enclosure of plastic bag L is known herein as ATOP. The surface area of the bottom enclosure of plastic bag L is known herein as ABOT. Preferably, ratio of ATOP to ABOT is 3:1 or lower; more preferably 2.5:1 or lower. Preferably, ratio of ATOP to ABOT is 1:1 or higher; more preferably 1.2:1 or higher.

Preferably, the ratio of the weight of bananas enclosed in the top enclosure of plastic bag L to the weight of bananas enclosed in the bottom enclosure of plastic bag L (i.e., the ratio of the weight of T1 plus T2 to the weight of B1 plus B2) is 0.6:1 or higher; more preferably 0.8:1 or higher. Preferably, the ratio of the weight of bananas enclosed in the top enclosure of plastic bag L to the weight of bananas enclosed in the bottom enclosure of plastic bag L is 3:1 or lower; more preferably 2:1 or lower; more preferably 1.5:1 or lower.

Preferably, the portion of the plastic bag L shown in FIG. 1 enclosing banana rows B1 and B2 is the bottom zone of the plastic bag L. That is, preferably the portion of the bag L shown in FIG. 2 between the bottom 8 and the line 17 drawn at the tops of the short lines of perforation 11 and 12 forms the bottom enclosure of the plastic bag L. Preferably the portion of the plastic bag L shown in FIG. 1 enclosing banana rows T1 and T2 is the top zone of the plastic bag L. That is, preferably the portion of the bag L shown in FIG. 2 between the top 7 and the line 17 drawn at the tops of the short lines of perforation 11 and 12 forms the top enclosure of the plastic bag L, while a small portion of the plastic bag L near the top 7 is envisioned to be gathered together under closing device G.

Preferably, the kraft paper liner K is perforated. Preferably, perforations in the kraft paper liner K are located both on the portion of the kraft paper liner K that is on the bottom of the box BX on the portion of the kraft paper liner K that is positioned between the bottom row of bananas B2 and the top row of bananas T2 as well as on the portion of the kraft paper liner K that is positioned between the bottom row of bananas B1 and the top row of bananas T1.

Preferably, the perforations in the kraft paper liner have average diameter of 0.5 cm or higher; more preferably 1 cm or higher. Preferably, the perforations in the kraft paper liner have average diameter of 30 cm or smaller; more preferably 10 cm or smaller; more preferably 3 cm or smaller.

The sum of the number of holes in the kraft paper liner K located on the portion of the kraft paper liner K that is positioned between the bottom row of bananas B2 and the top row of bananas T2 plus the number of holes in the kraft paper liner K located on the portion of the kraft paper liner K that is positioned between the bottom row of bananas B1 and the top row of bananas T1 is known herein as "NSIDES." Preferably, NSIDES is 10 or higher; more preferred is 20 or higher; more preferred is 35 or higher. Preferably, NSIDES is 600 or lower; more preferred is 500 or lower.

It is believed that reducing the length of the kraft paper liner; adding extra ventilation holes to the kraft paper liner; or adding circular notches to the edge of the kraft paper liner can also help equalize the gas environment between the bottom and top of the box BX by reducing the gas flow restriction or creating a "chimney" between bottom and top layers of bananas.

FIG. 1 depicts a preferred embodiment, and other embodiments are also envisioned. For example, the use of produce other than bananas is envisioned. Preferably the produce is chosen from fruits and vegetables. Produce may be climacteric or non-climacteric. Among non-climacteric produce, preferred are asparagus, broccoli, brussels sprouts, okra, leafy greens, fresh peas, and sweet corn. Climacteric produce is preferred. Preferred climacteric produce is banana, avocado, and melon; more preferred is banana.

Also, embodiments are envisioned in which kraft paper liner K is not used. Also envisioned are embodiments in which a box BX is not used. Envisioned are embodiments that use produce other than bananas. Further, embodiments are envisioned in which produce is arranged differently from the arrangement shown in FIG. 1. Preferred are arrangements of produce in which there are at least two layers of produce, with some portion of the plastic bag L residing in between the layers of produce.

Also envisioned are embodiments (herein called "non-fold" embodiments) in which kraft paper liner K is not used and in which the plastic bag L is not folded. In non-fold embodiments, there is no layer of bag material between distinct layers of produce. In non-fold embodiments, a relatively large proportion of the surface area of the bottom portion of the plastic bag L may be in contact with the sides and/or bottom of the box BX in comparison with the top portion of the plastic bag L; thus, contact of the box BX with the bottom portion of the plastic bag L may restrict gas transport in and out of the plastic bag L more than does contact of the box BX with the top portion of plastic bag L. Therefore it is contemplated that the plastic bag L will provide benefits in non-fold embodiments. Non-fold embodiments are contemplated for use with produce other than bananas.

Preferred are embodiments in which the total amount of bananas inside the plastic bag of the present invention is 4 kg or more; more preferably 10 kg or more; more preferably 15 kg or more. Preferred are embodiments in which the total amount of bananas inside the plastic bag of the present invention is 30 kg or less; more preferably 25 kg or less; more preferably 22 kg or less.

It is useful to characterize a portion of a plastic bag of the present invention that contain bananas by the banana-specific perforation, which is defined as the total area of the holes in that portion of the bag (for example, in units of square millimeters) divided by the mass of the bananas (for example, in units of kilograms) enclosed by that portion of the plastic bag.

The preferred banana-specific perforation of the top enclosure of a plastic bag of the present invention that contain bananas is 0.025 $mm^2/kg$ or more; more preferably 0.05 $mm^2/kg$ or more; more preferably 0.075 $mm^2/kg$ or more. The preferred banana-specific perforation of the top enclosure of a plastic bag of the present invention that contain bananas is 3 $mm^2/kg$ or less; more preferably 2.5 $mm^2/kg$ or less; more preferably 2 $mm^2/kg$ or less.

Preferably, for a plastic bag of the present invention that contains bananas, the ratio of the banana-specific perforation of the bottom enclosure to the banana-specific perforation of the top enclosure is 6:1 or less; more preferably 5:1 or less; more preferably 4:1 or less. Preferably, for a plastic bag of the present invention that contains bananas, the ratio of the banana-specific perforation of the bottom enclosure to the banana-specific perforation of the top enclosure is 0.3:1 or higher; more preferably 0.4:1 or higher; more preferably 0.6:1 or higher.

In some embodiments, bananas are harvested and immediately placed into bags of the present invention. In preferred embodiments, the time from harvest to placement into bags of the present invention is 14 days or less, more preferably 7 days or less, more preferably 2 days or less. In preferred embodiments, harvested bananas are placed into bags of the present invention prior to shipment, and the harvested bananas remain in the bags of the present invention during shipment. In some embodiments, bananas are shipped to a destination that is near the intended point of sale to consumers. As used herein, "near the intended point of sale to consumers" means a location from which it is capable to transport the bananas to the point of sale to consumers in 5 days or fewer by truck or other surface transportation.

In some embodiments, at the time of packing, air can be sucked out from the void areas using a hand held vacuum pump and then quickly sealed to aid in passive MAP development. Alternatively, in some embodiments, bags can also be subject to predefined atmosphere composition also known as active MAP or held under controlled atmosphere (CA) conditions for long term transit and storage. The commonly used atmospheres for active MAP or CA are 3-5% $O_2$ and 3-5% $CO_2$, by weight based on the weight of the atmosphere.

A few useful categories of produce may be defined. As defined herein, "chilling-sensitive" produce is produce that loses desirable qualities if it is exposed to long periods of temperatures at or below 12° C. For example, bananas and some other tropical produce are chilling-sensitive. As defined herein, "EE" produce is produce that does not ripen desirably until exposed to exogenous ethylene. For example, green bananas as they are normally harvested are EE produce. As defined herein, "HT" produce is produce that does not ripen desirably as long at it is stored below 10° C. and then does ripen normally after exposure to higher temperature of 20° C. or higher. For example, avocado and mango are HT produce.

Preferably, plastic bags of the present invention that contain produce are stored for relatively long periods of time, preferably at reduced temperature. Such storage may take place, for example, during shipment of produce from one location to another. Preferably, plastic bags of the present invention that contain produce are stored for 7 days or more; more preferably 10 days or more. Preferably, plastic bags of the present invention that contain produce are stored for 20 days or fewer. Preferably, plastic bags of the present invention that contain chilling-sensitive produce are stored at temperature of 13° C. or higher. Preferably, plastic bags of the present invention that contain produce are stored at temperature of 20° C. or lower; more preferably 15° C. or lower.

Preferably, plastic bags of the present invention that contain EE produce are exposed to an atmosphere that contains ethylene. The preferred temperature for performing exposure to ethylene is 13.5° C. or higher; more preferably 14° C. or higher. The preferred temperature for performing exposure to ethylene is 18.3° C. or lower.

In preferred methods of exposing plastic bags of the present invention that contain EE produce to ethylene, bags of the present invention that contain produce are exposed to an atmosphere that contains molecules of ethylene. The preferred concentration of ethylene in the atmosphere is 20 ppm or higher; more preferably 50 ppm or higher; more preferably 100 ppm or higher. The preferred concentration of ethylene in the atmosphere is 1,000 ppm or less; or 500 ppm or less; or 300 ppm or less.

The preferred duration of the exposure of plastic bags of the present invention that contain EE produce to an atmosphere that contains ethylene is 8 hours or more; more preferably 16 hours or more; more preferably 20 hours or more. The preferred duration of the exposure of plastic bags of the present invention that contain EE produce to an atmosphere that contains ethylene is 48 hours or less; more preferably 36 hours or less; more preferably 24 hours or less.

Among embodiments in which HT produce is used, it is preferred to maintain the produce below 15° C. until immediately prior to distribution to retail stores, at which time the produce is preferably kept at 20 to 22° C. for 24 to 48 hours.

Preferably, plastic bags of the present invention that contain produce are exposed to one or more cyclopropene compound. In preferred cyclopropene compounds, $R^2$, $R^3$ and $R^4$ are hydrogen. Preferably, $R^1$ is a substituted or unsubstituted C1-C8 alkyl group; more preferably, $R^1$ is methyl. Preferably, bags of the present invention that contain produce are exposed to an atmosphere that contains molecules, in gaseous form, of one or more cyclopropene compound. Preferably, the concentration of cyclopropene compound is 0.5 ppb or higher; more preferably is 1 ppb or higher; more preferably is 10 ppb or higher; more preferably 100 ppb or higher. Preferably, the concentration of cyclopropene compound is 100 ppm or lower, more preferably 50 ppm or lower, more preferably 10 ppm or lower, more preferably 5 ppm or lower.

The preferred temperature for performing exposure to cyclopropene compound is 8° C. or higher; more preferably 11° C. or higher. The preferred temperature for performing exposure to cyclopropene compound is 18.3° C. or lower.

The preferred duration of the exposure of plastic bags of the present invention that contain produce to an atmosphere that contains cyclopropene compound is 4 hours or more; more preferably 8 hours or more; more preferably 10 hours or more. The preferred duration of the exposure of plastic bags of the present invention that contain produce to an atmosphere that contains cyclopropene compound is 24 hours or less; more preferably 18 hours or less.

Preferably, plastic bags of the present invention that contain bananas are exposed to an atmosphere containing a cyclopropene compound when the bananas have peel color rating of 2.5 to 3.5 on the 7-stage scale. The 7-stage scale is described as follows:

The color of banana peels is rated according to a seven stage rating scale: stage 1 (dark green); stage 2 (all light green); stage 3 (half green and half yellow); stage 4 (more yellow than green); stage 5 (green tips and necks); stage 6 (all yellow; maybe light green necks, no green tips); stage 7 (yellow flecked with brown). Consumers generally prefer to eat bananas in stage 5 or stage 6.

The following are examples of the present invention.

Oxygen concentration was measured using a Pac Check™ 325 (Mocon, Inc.) or equivalent instrument.

Carbon dioxide concentration was measured using a Pac Check™ 325 (Mocon, Inc.) or equivalent instrument.

Perforation diameter was measured using a visual instrument from Micro-Vu Corporation, using best fit elliptical axes and then calculating the area of the ellipse and then calculating the diameter of a circle having the same diameter.

The following abbreviations are used:

P'O2=Oxygen Permeability Coefficient in units of $cm^3{}_{OC}$ mil/(m² day)

P'CO2=Carbon Dioxide Permeability Coefficient in units of $cm^3{}_{OC}$ mil/(m² day)

Bottom=bottom 45.7 cm (18 inches) of the bag

Top=top 91.4 cm (36 inches) of the bag

PE=ELITE™ 5400G enhanced polyethylene resin (Dow Chemical Co.)

EVA=EB502AA ethylene/vinyl acetate copolymer (Westlake Chemical Co.)

Slip=Ampacet 101797

Anti-Block=Ampacet 10063

P-Area=total area of perforations, in mm2

S-Area=surface area of that portion of the bag, in m2

P-Density=P-Area divided by S-Area, in mm2 per m2

P-Ratio=P-Density of the bottom to the P-Density of the top

Av=Average

COMPARATIVE EXAMPLE C1 TO C4: SINGLE CHAMBER BAG IN-COUNTRY PACKAGING

A mono layer film for Comparative Example C1 and Comparative Example C2 was produced by extruding a 94 cm (37 inch) diameter tube on a conventional upward blown film line. A mono layer film for Comparative Example C3 and Comparative Example C4 was produced by extruding a 99.7 cm (39.25 inch) diameter tube on a conventional upward blown film line. The composition of the film and the film properties are provided in Tables 1A and 1B. The tube film was sealed and scored for tear off on the film line to produce bags on a roll. The tube film was perforated using a beam compression laser perforation system as follows and as detailed in Table 2A.

In Comparative Examples C1 to C4, each bag had four lines of perforations similar to lines 9, 10, 13, and 14 in FIG. 2. Every line of perforation ran the length of the bag; there was no abbreviated line of perforations similar to lines 11 and 12 in FIG. 2. In Comparative Examples C1 and C2, the distances from the left side of the bag to each line of perforation was as follows: 3.8 cm, 45.7 cm, 83.8 cm, and 89.9 cm. In Comparative Examples C3 and C4, the distances from the left side of the bag to each line of perforation was as follows: 4.1 cm, 50.5 cm, 92.1 cm, and 96.4 cm.

The perforation area is in units of mm²; for the bottom 45.7 cm (18 inch) length of the bag and for the top 91.4 cm (36 inch) length of the bag is given in Table 2B.

The perforated bags were used to package bananas in Guatemala in the conventional manner as shown in FIG. 1 and shipped to the United States for ripening. The bananas were ripened as follows. The temperatures shown are pulp temperatures; if necessary, the thermostat was lowered so that pulp temperature remained at the desired temperature despite any respiration that may be taking place in the bananas.

day 0: 17.8° C. (64° F.), in normal air day 1: 17.8° C. (64° F.), ethylene at 200 ppm for 24 hours day 2: 17.8° C. (64° F.), room was vented for 30 min., then re-sealed.

day 3: 17.8° C. (58° F.)

day 4: 14.4° C. (58° F.)

day 5: 14.4° C. (58° F.)

While still in the bags, the bananas were then treated with 1-methylcyclopropene (1-MCP) on Day 5 as follows. The bags with the bananas inside were place in an enclosed volume, at 13.3° C. (56° F.), and sufficient 1-MCP was released into that volume to give a concentration of 1000 ppb. The volume remained enclosed and was held at 13.3° C. for 12 hours. The bananas were then removed from the ripening room and stored at 21.7° C. (71° F.). The gas atmosphere in the bottom and top portion of the bag was measured on Day 2, Day 3, and Day 4 post 1-MCP treatment with the results given in Table 3.

The desired oxygen concentration in the atmosphere of the bag was 5.5% to 11.5% by weight. The oxygen concentration in the bottom of the bag for Comparative Examples C1 to C4 was unacceptably low. Also, Comparative Examples C3 and C4 had anaerobic characteristics present in the banana taste.

TABLE 1A

Film Composition

| Example | PE | EVA | Slip | Anti-Block | Tube Width cm (inch) | Thickness micrometer (mil) |
|---|---|---|---|---|---|---|
| C1 | 69% | 20% | 6% | 5% | 91.4 (36) | 26.9 (1.06) |
| C2 | 79% | 12% | 4% | 5% | 91.4 (36) | 26.4 (1.04) |
| C3 | 79% | 12% | 4% | 5% | 99.1 (39) | 27.9 (1.10) |
| C4 | 71% | 20% | 4% | 5% | 99.1 (39) | 26.9 (1.06) |

Amounts shown are by weight based on the weight of the film.

TABLE 1B

Film Properties

| Example | P'O2 | P'CO2 | Tensile Toughness MD MPa (psi) |
|---|---|---|---|
| C1 | 7,640 | 40,900 | 61.81 (8965) |
| C2 | 9,100 | 45,400 | 56.95 (8260) |
| C3 | 8,820 | 44,600 | 59.92 (8690) |
| C4 | 7,890 | 41,400 | 58.12 (8430) |

TABLE 2A

Film Perforation Details

| Example | Spacing of perforations, mm | Diameter of perforations, micrometers |
|---|---|---|
| C1 | 5.43 | 114.0 |
| C2 | 5.44 | 117.8 |
| C3 | 5.49 | 109.1 |
| C4 | 5.48 | 101.5 |

TABLE 2B

Further Film Perforation Details

| | Bottom | | | Top | | | |
|---|---|---|---|---|---|---|---|
| Example | P-Area | S-Area | P-Density | P-Area | S-Area | P-Density | P-Ratio |
| C1 | 6.88 | 0.836 | 8.2 | 13.75 | 1.67 | 8.2 | 1.00:1 |
| C2 | 7.33 | 0.836 | 8.8 | 14.66 | 1.67 | 8.8 | 1.00:1 |
| C3 | 6.23 | 0.906 | 6.9 | 12.46 | 1.81 | 6.9 | 1.00:1 |
| C4 | 5.40 | 0.906 | 6.0 | 10.80 | 1.81 | 6.0 | 1.00:1 |

TABLE 3

Gas Atmosphere Data for Comparative Examples 1 to 4.

| Example | Average Oxygen Conc. on Day 2, 3, & 4; Bottom | Average Oxygen Conc. on Day 2, 3, & 4; Top | Minimum Oxygen Conc. Bottom and Day | Average Carbon Dioxide Conc. on Day 2, 3, & 4; Bottom | Average Carbon Dioxide Conc. on Day 2, 3, & 4; Top |
|---|---|---|---|---|---|
| C1 | 5.3% | 9.2% | 4.9% Day 4 | 15.3% | 9.7% |
| C2 | 5.1% | 8.8% | 4.3% Day 4 | 15.0% | 10.3% |
| C3 | 2.1% | 8.0% | 2.2% Day 3 | 22.9% | 12.0% |
| C4 | 2.4% | 7.6% | 2.4% Day 3 | 22.6% | 12.4% |

INVENTION EXAMPLES 1 TO 4

Dual Chamber Bag in Country Packaging

A mono layer film for Invention Examples 1 through Invention Example 4 was produced by extruding a 99.7 cm (39.25 inch) diameter tube on a conventional film line. The composition of the film and the film properties are provided in Table 4A and 4B. The tube film was sealed and scored for tear off on the film line to produce bags on a roll. The tube film was perforated using a beam compression laser perforation system in the pattern shown in FIG. 2 and as detailed in Table 5A and 5B. Distances were as follows:

| from | to | distance (cm) |
|---|---|---|
| left side 15 of bag L | line 9 | 7.37 |
| left side 15 of bag L | line 10 | 12.45 |
| right side 16 of bag L | line 14 | 6.35 |
| right side 16 of bag L | line 13 | 11.68 |
| right side 16 of bag L | line 12 | 33.27 |
| right side 16 of bag L | line 11 | 66.55 |

The perforation area is in units of mm²; for the bottom 45.7 cm (18 inches) length of the bag and for the top 91.4 cm (36 inches) length of the bag is given in Table 5. The short lanes of perforations at the bottom of the bag were indexed using an eyespot on the bag and an eyespot reader on the perforation machine. The perforated bags were used to package bananas in Guatemala in the conventional manner as shown in FIG. 1 and shipped to the United States for ripening. The bananas were ripened using a conventional 5 day ripening cycle as above and then treated with 1000 ppb of 1-MCP as above on Day 5. The bananas were then removed from the ripening room and stored at 21.7° C. (71° F.). The gas atmosphere in the bottom and top portion of the bag was measured on Day 2, Day 3, and Day 4 post 1-MCP treatment with the results given in Table 6.

The oxygen concentration for the bottom 45.7 cm (18 inches) of the banana bag is above the desired target of 5.5% or higher while the oxygen concentration in the top 91.4 cm (36 inches) of the banana bag is within the target of 11.5% or lower.

TABLE 4A

Film Composition for Invention Examples 1 to 4

| Example | PE | EVA | Slip | Anti-Block | PPA | Thickness; micrometer (mil) |
|---|---|---|---|---|---|---|
| 1 | 69% | 20% | 4% | 5% | 2% | 27.4 (1.08) |
| 2 | 69% | 20% | 4% | 5% | 2% | 27.4 (1.08) |
| 3 | 69% | 20% | 4% | 5% | 2% | 27.4 (1.08) |
| 4 | 69% | 20% | 4% | 5% | 2% | 27.4 (1.08) |

TABLE 4B

Film Properties for Invention Examples 1 to 4

| Example | P'O2 | P'CO2 | Tensile Toughness; MD MPa (psi) |
|---|---|---|---|
| 1 | 7,920 | 45,700 | 52.06 (7,550) |
| 2 | 7,920 | 45,700 | 52.06 (7,550) |
| 3 | 7,920 | 45,700 | 52.06 (7,550) |
| 4 | 7,920 | 45,700 | 52.06 (7,550) |

TABLE 5A

Film Perforation Details for Invention Examples 1 to 4

| Example | Full Lane Perforation Spacing; mm | Full Lane Perforation Diameter; micrometer | Short Lane Perforation Spacing; mm | Short Lane Perforation Diameter; micrometer |
|---|---|---|---|---|
| 1 | 5.418 | 110.2 | 4.81 | 116.9 |
| 2 | 5.439 | 110.2 | 3.857 | 116.9 |
| 3 | 5.424 | 110.2 | 2.686 | 116.9 |
| 4 | 6.040 | 110.2 | 3.392 | 114.8 |

TABLE 5B

Further Film Perforation Details for Invention Examples 1 to 4

| | Bottom | | | Top | | | |
|---|---|---|---|---|---|---|---|
| Example | P-Area | S-Area | P-Density | P-Area | S-Area | P-Density | P-Ratio |
| 1 | 10.48 | 0.906 | 11.6 | 12.88 | 1.81 | 7.1 | 1.6:1 |
| 2 | 11.44 | 0.906 | 12.6 | 12.83 | 1.81 | 7.1 | 1.8:1 |
| 3 | 13.71 | 0.906 | 15.1 | 12.86 | 1.81 | 7.1 | 2.1:1 |
| 4 | 11.29 | 0.906 | 12.5 | 11.55 | 1.81 | 6.4 | 2.0:1 |

TABLE 6

Gas Atmosphere Data for Invention Examples 1 to 4.

| Example | Av Oxygen Conc. Day 2, 3, & 4; Bottom | Av Oxygen Conc. Day 2, 3, & 4; Top | Av Carbon Dioxide Conc. Day 2, 3, & 4; Bottom | Av Carbon Dioxide Conc. Day 2, 3, & 4; Top |
|---|---|---|---|---|
| 1 | 5.8% | 11.0% | 14.7% | 9.1% |
| 2 | 6.4% | 11.2% | 14.5% | 8.7% |
| 3 | 5.7% | 10.2% | 15.0% | 12.6% |
| 4 | 6.3% | 9.1% | 14.6% | 10.5% |

What is claimed is:

1. A method of treating produce comprising
   (a) placing a first portion of produce in a bottom a plastic bag;
   (b) after step (a), folding said bag to form a layer of bag material over said first portion of produce;
   (c) after step (b), placing a second portion of produce in said bag above said layer of bag material; and
   (d) after step (c), closing said bag,
   wherein the plastic bag has a volume of 100 liters or more;
   wherein the plastic bag comprises a plurality of perforations each having an average perforation diameter of 500 micrometers or less;
   wherein the plastic bag comprises a lower zone and a top zone,
   and wherein the lower zone has a perforation density that is greater than a perforation density of perforation density of the top zone.

2. The method of claim 1, wherein the ratio of said perforation density of said lower zone to said perforation density of said top zone is 1.1:1 or higher.

3. The method of claim 1, wherein the perforation density of the top zone of the plastic bag is 2 mm$^2$ of perforation per m$^2$ of a surface area of the bag or higher.

4. The method of claim 1, wherein said produce comprises bananas.

5. The method of claim 4, wherein the ratio of the banana-specific perforation of the bottom enclosure of said bag to the banana-specific perforation of the top enclosure of said bag is from 0.3:1 to 5:1.

6. The method of claim 1, further comprising the step of
   (e) after step (d), storing said bag for 7 days or more at 20° C. or lower.

7. The method claim 6, further comprising the step of
   (f) after step (e), exposing said bag to an atmosphere that contains ethylene.

8. The method claim 7, further comprising the step of
   (g) after step (f), exposing said bag to an atmosphere that contains a cyclopropene compound.

9. The method of claim 8, wherein the step (g) is performed at a temperature of 8° C. or higher.

10. The method of claim 8, wherein step (g) is performed at a temperature of 18.3° C. or lower.

11. The method of claim 8, wherein step (g) is performed for 4 hours or more.

12. The method of claim 8, wherein step (g) is performed for 24 hours or less.

13. The method of claim 7, wherein the concentration of ethylene in the atmosphere is 20 ppm or higher.

14. The method of claim 7, wherein the concentration of ethylene in the atmosphere is 1,000 ppm or less.

15. The method of claim 7, wherein the bag is exposed to the atmosphere that contains ethylene for 48 hours or less.

16. The method of claim 1, further comprising placing the plastic bag in a box.

17. The method of claim 16, further comprising placing a kraft paper liner in the box prior to placing the plastic bag in the box.

18. The method of claim 17, wherein the kraft paper liner comprises perforations.

19. The method of claim 1, wherein the first portion of produce and the second portion produce have a combined weight of 4 kg or more.

20. The method of claim 19, wherein the combined weight of the first portion of produce and the second portion of produce is 30 kg or less.

* * * * *